US012335065B2

(12) United States Patent
Massone et al.

(10) Patent No.: US 12,335,065 B2
(45) Date of Patent: Jun. 17, 2025

(54) DEVICES, SYSTEMS AND METHODS FOR TRANSMITTING DATA COMPLIANT WITH HOME NETWORKING STANDARD OVER TWISTED PAIR CABLES

(71) Applicant: Actelis Networks Inc., Fremont, CA (US)

(72) Inventors: Gary Earl Massone, Concord, CA (US); Elad Domanovitz, Toronto (CA)

(73) Assignee: Actelis Networks Inc., Fremont, CA (US)

( * ) Notice: Subject to any disclaimer, the term of this patent is extended or adjusted under 35 U.S.C. 154(b) by 0 days.

(21) Appl. No.: 18/442,115

(22) Filed: Feb. 15, 2024

(65) Prior Publication Data

US 2025/0047519 A1   Feb. 6, 2025

Related U.S. Application Data

(63) Continuation-in-part of application No. PCT/US2022/048844, filed on Nov. 3, 2022.
(Continued)

(51) Int. Cl.
*H04L 12/28* (2006.01)
*H04B 3/32* (2006.01)
*H04L 5/14* (2006.01)

(52) U.S. Cl.
CPC ........... *H04L 12/2892* (2013.01); *H04B 3/32* (2013.01); *H04L 5/1461* (2013.01)

(58) Field of Classification Search
CPC ............................ H04L 12/2892; H04B 3/32
(Continued)

(56) References Cited

U.S. PATENT DOCUMENTS 11,296,748 B2 *  4/2022  Lee .................... H04W 8/18
2013/0088987 A1   4/2013  Preschutti
(Continued)

FOREIGN PATENT DOCUMENTS

EP      3128710     2/2017

OTHER PUBLICATIONS

International Search Report for PCT Application No. PCT/US2022/048844, mailed Mar. 10, 2023.
(Continued)

*Primary Examiner* — Sibte H Bukhari
(74) *Attorney, Agent, or Firm* — PEARL COHEN ZEDEK LATZER BARATZ LLP (57) ABSTRACT

Devices, systems, and methods for transmitting data compliant with home networking standards over twisted pair cables are provided herein. One embodiment of the devices compliant with the G.hn is configured to transmit to a plurality of customer premise equipment (CPE) devices over twisted pairs. The device may include a G.hn access multiplexer (GAM) configured for transmitting data over coax cable and having a coax port; a single port to N-ports coax splitter, wherein the single port is connected to the coax port of the G.hn GAM, and wherein N is an integer; and N coax-to-twisted pair cable transformers, each connected to a respective port of the N-ports of the coax splitter. Another device embodiment has the order of the splitter and the transformer swapped. The systems implement the devices in an existing infrastructure of twisted pair cables, and the methods are directed to the installation process of same.

7 Claims, 8 Drawing Sheets

Related U.S. Application Data

(60) Provisional application No. 63/275,150, filed on Nov. 3, 2021.

(58) Field of Classification Search
USPC .......................................................... 370/201
See application file for complete search history.

(56) References Cited

U.S. PATENT DOCUMENTS

| | | |
|---|---|---|
| 2013/0279369 A1 | 10/2013 | Drooghaag |
| 2014/0204952 A1 | 7/2014 | Gacanin |
| 2017/0026079 A1* | 1/2017 | Yoon ................... H04M 11/062 |
| 2018/0131396 A1* | 5/2018 | Preschutti ............ H03G 3/3042 |

OTHER PUBLICATIONS

Editor TPLS G-HN: "Draft technical paper TPLS. G-HN on "Operation of G.hn technology over access and in-premises phone line medium" (for Agreement Jul. 3, 2015); TD 392 (PLEN/15)"; ITU-T draft; study period 2013-2016, International Telecommunication Union, Geneva, CH; vol. 18/15, Jun. 9, 2015, pp. 1-19.

* cited by examiner

DEVICES, SYSTEMS AND METHODS FOR TRANSMITTING DATA COMPLIANT WITH HOME NETWORKING STANDARD OVER TWISTED PAIR CABLES

CROSS REFERENCE TO RELATED APPLICATION

This application is a Continuation-In-Part of PCT Application No. PCT/US2022/48844 filed Nov. 3, 2022, which claims the benefit of U.S. Provisional Patent Application No. 63/275,150 filed Nov. 3, 2021, which is incorporated herein by reference in its entirety.

FIELD OF THE INVENTION

The present invention generally relates to the field of utilizing G.hn (home network) transmission over the last section of the access network wire and, more particularly, suggests a device and system that performs a point-to-multipoint transmission of information to and from end-users over twisted pair bundles using g.hn device designed for transmission over coax.

BACKGROUND OF THE INVENTION

As the need for bandwidth increases, the architecture of providing it to end-customers using digital subscriber lines (DSL) has evolved. Until a few years ago, fiber optics (or other means for providing high-throughput) were used to connect central offices (CO) or cabinets to the backbone of the network, and from the CO/cabinet, service was provided using existing infrastructure such as phone lines (twisted-pairs) or coax. As the need for high bandwidth increased, many operators started to push fiber closer to the customer, aiming to reach all the way to their home. However, while reaching a close point with fiber (for example, the basement of a building) can be achieved in a cost-effective way, paving fiber from that point to the end customer is a very costly operation; it requires cooperation from the landlord and often requires sending a technician who may delay deployment. One possible way to overcome these issues is to keep utilizing the existing infrastructure (mainly twisted pair or coax) to bridge the last gap. The demarcation point with the uplink to the outside network is denoted herein as the multiplexing point.

G.hn is a specification for home networking with an extension for deployment in the access, with data rates currently up to 2 Gbit/s (while the next version is planned to support up to 10 Gbit/s) and operation over four types of legacy wires: telephone wiring, coaxial cables, power lines, and plastic optical fiber. Although most elements of G.hn are common for all media types supported by the standard G.hn includes media-specific optimizations for each media. Some of these media-specific parameters include:

Transmission architecture: multi-point-to-point in phone lines (i.e., a pair of transceivers is allocated per phone line, which means that for each line, there is a transceiver that transmits/receives for a single transceiver), point-to-multi-point in coax and power lines (i.e., a single transceiver communicates with multiple transceivers).

OFDM Carrier Spacing: 195.31 kHz in coaxial, 48.82 kHz in phone lines, 24.41 kHz in power lines.

FEC Rates: G.hn's FEC can operate with code rates 1/2, 2/3, 5/6, 16/18 and 20/21. Although these rates are not media specific, the higher code rates are expected to be used in cleaner media (such as coaxial) while the lower code rates will be used in noisy environments such as power lines.

Automatic repeat request (ARQ) mechanisms: G.hn supports operation both with and without ARQ (re-transmission). Although this is not media specific, it is expected that ARQ-less operation is sometimes appropriate for cleaner media (such as coaxial) while ARQ operation is appropriate for noisy environments such as power lines.

Power levels and frequency bands: G.hn defines different power masks for each media.

MIMO support is defined only for twisted pair.

The current G.hn recommendation defines a communication protocol for phone line medium (twisted pairs) and different flavors over coax line medium that enables data rates up to 2 Gbps for in-premises and access networks. Transmission is performed using a Time Division Multiple Access (TDMA) architecture and a spectrum up to 200 MHz while using orthogonal frequency division multiplexing (OFDM) in each allocated time slot. One of the major differences between phone line medium and coax medium is the architecture in which they are deployed. While each customer's premises has a dedicated phone line connecting it to a central multiplexing point, in many cases, when coax is deployed, there is a single coax cable connecting all customer's premises to those central multiplexing points. This creates different challenges each G.hn flavor must deal with. Over twisted pair, standard (state of the art) g.hn simultaneous transmission to multiple users creates crosstalk that degrades performance. Over coax, a single transceiver has to communicate with multiple transceivers. Thus, much more coordination is required between the transceiver located at the multiplexing point and the transceiver located at the customer's premise.

Generic Network Architecture

Figure 1:
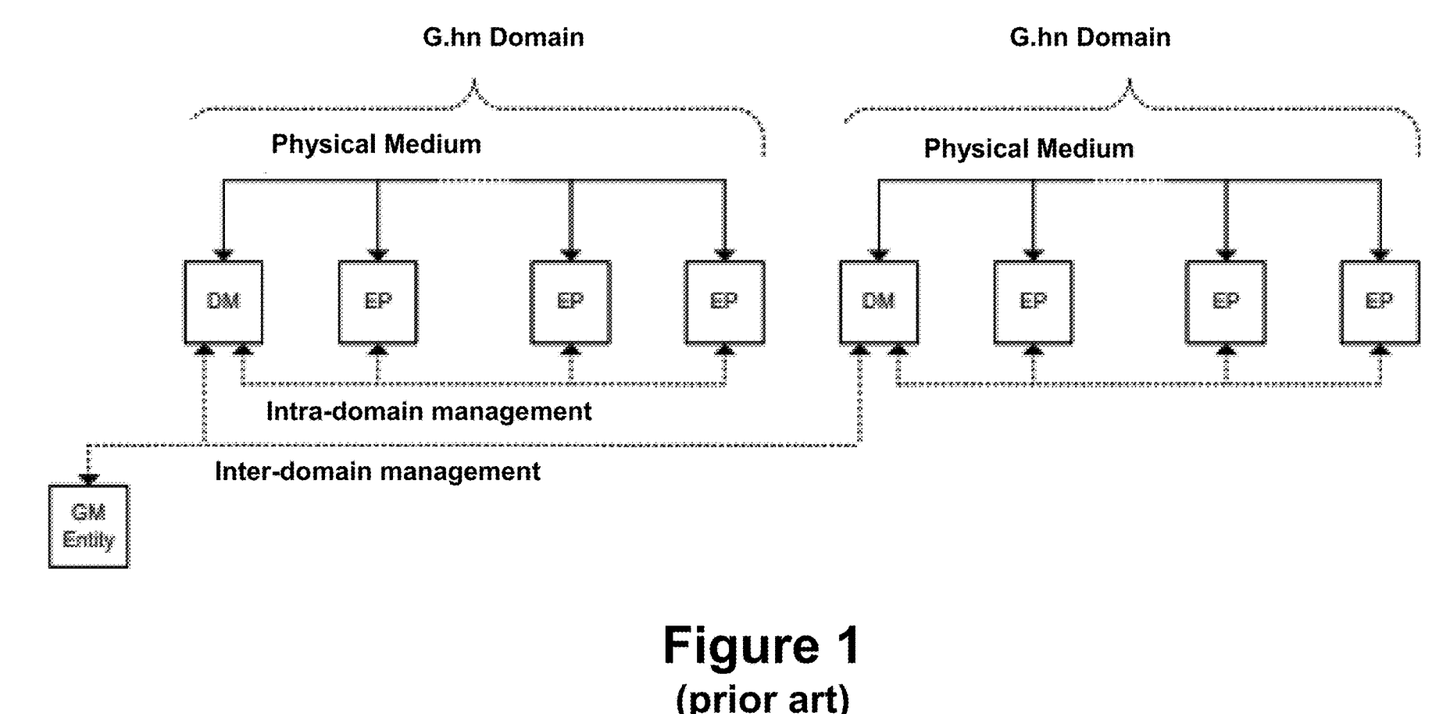
FIG. 1 is a block diagram showing an aspect of the architecture of the G.hn domain in accordance with the prior art.

FIG. 1 is a block diagram showing the architecture of the G.hn domain in accordance with the prior art. G.hn domain may be established over any wiring (power lines, coaxial cables, phone lines, and plastic optical fiber). For example, the distribution of broadband services in multi-dwelling units (MDUs) phone lines is a convenient option because it is widely available. Each G.hn domain may include up to 250 G.hn nodes, one of which is designated as domain master (DM), which coordinates the operation of all nodes in the domain. All other nodes in the domain are called "end-point nodes" (EP) or simply "nodes". The DM is responsible for assigning a schedule that meets the traffic constraints of the EPs and uses the available channel resources in the most efficient way. A G.hn network is composed of multiple domains. The global master (GM) function provides coordination of resources, priorities, and operational characteristics between neighboring domains of a G.hn network. The GM is a high-level management function that communicates with the management entities of the DMs and may also convey the relevant inter-domain coordination. For practical purposes, it is assumed that the DM is located at the multiplexing point, and the EP is located at the customer's premise.

Traditional Use of G.Hn in Broadband Applications Over Phone Lines

Figure 2:
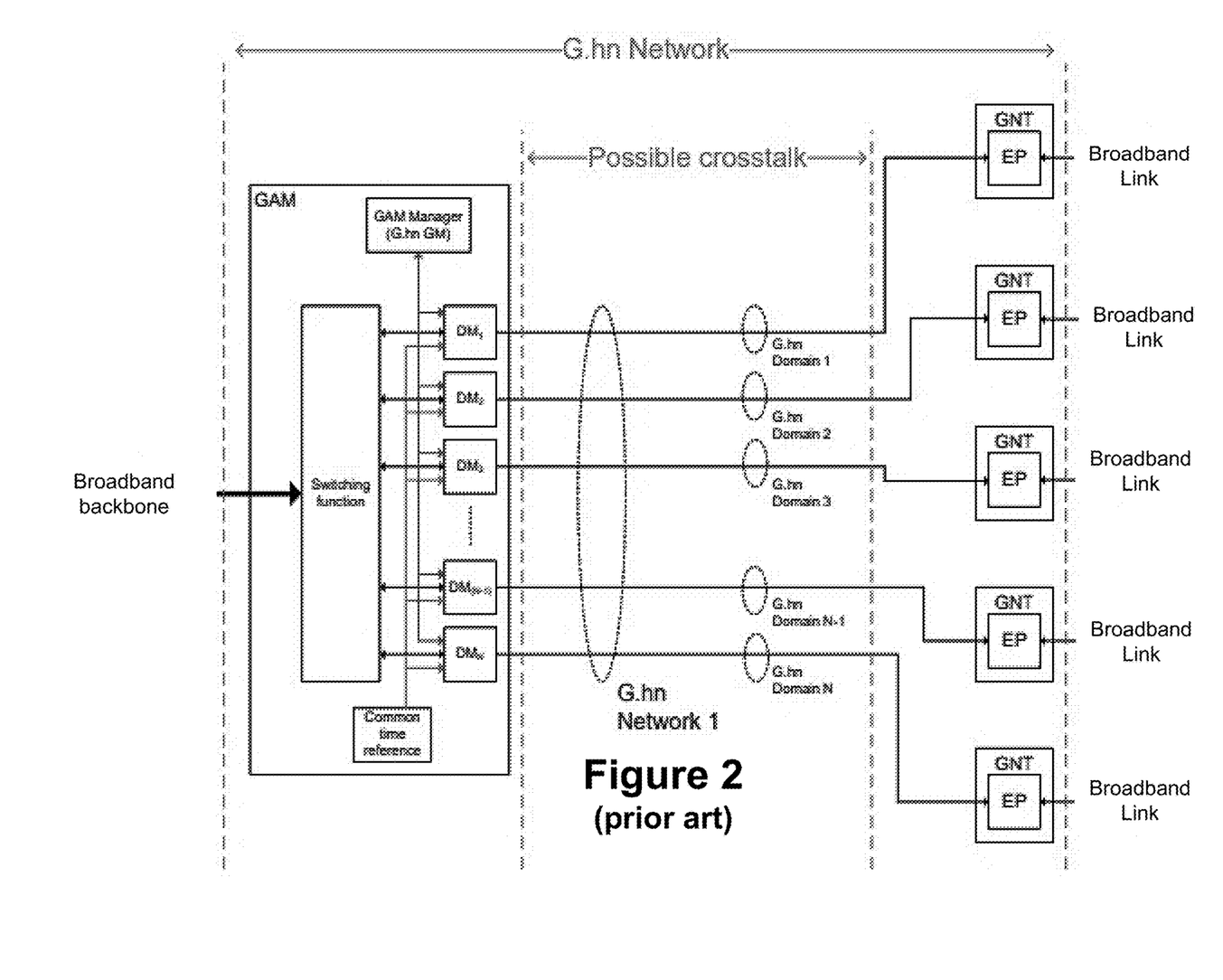
FIG. 2 is a block diagram showing another aspect of the architecture of the G.hn domain in accordance with the prior art.

FIG. 2 is a block diagram showing another aspect of the architecture of the G.hn domain in accordance with the prior art.

In accordance with the prior art, and as mentioned above, G.hn over a phone line may be optimized to handle crosstalk. In general, two types of crosstalk can be generated in multi-line transmission, near-end crosstalk (NEXT), where receivers are impacted by nearby transmitters (the receiver and the transmitter are either located at the multiplexing point or the customer's premise), and far-end crosstalk where receivers are impacted by the transmission of other users (the receiver is at the customer's premise and another transmitter is at the multiplexing point or vice-versa). However, G.hn over twisted pair includes techniques of crosstalk avoidance and mitigation between domains located over different phone lines. When multiple G.hn domains are operating over separate phone lines 2

G.hn nodes can cope with these two sources of crosstalk by imposing the following constraints on the G.hn domains in the network:

- Each point-to-point connection between the G.hn access multiplexer (hereinafter: GAM) and each of the G.hn Network Terminals (GNTs) is established by creating a G.hn domain composed of two nodes.
- The combination of the individual G.hn domains forms the coordinated G.hn network.
- The nodes located in the GAM are configured as G.hn Domain Master.
- Each domain has a different DomainId (domain identification).
- Each domain uses a different preamble seed to achieve near-orthogonal preamble signals. This allows nodes of a domain to decode only the frames belonging to nodes of the same domain.
- DS/US transmissions within the different domains are synchronized by the alignment of the scheduling of each of the domains in the G.hn Network in order to eliminate NEXT.
- Nodes constantly send information about the FEXT channels to the GM.
- Power spectrum density (PSD) masks are optimized based on the traffic requirements of different nodes.
- Bit-loading and Forward Error Correction are dynamically optimized to operate under the noise created by far-end crosstalk (FEXT).

Figure 3A:
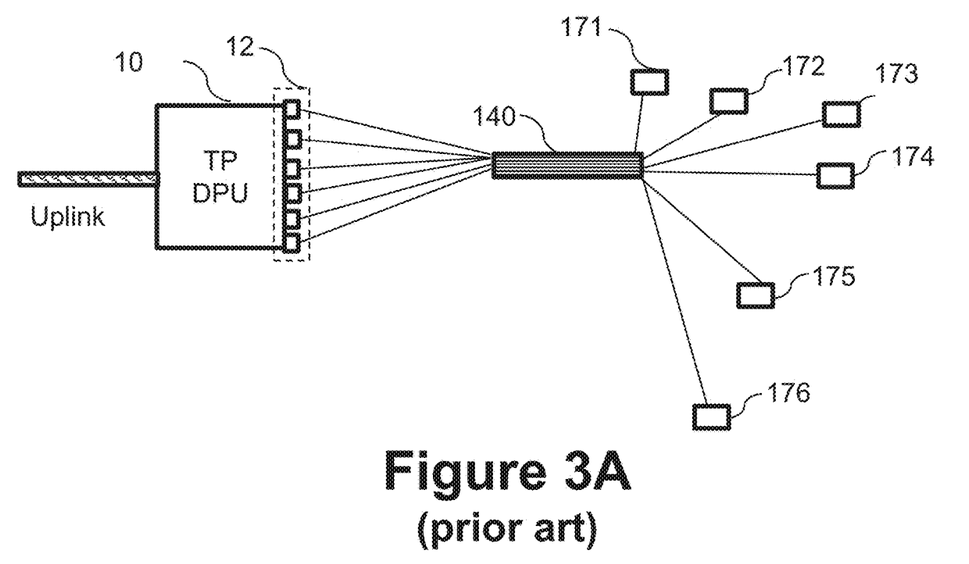
FIG. 3A is a block diagram showing yet another aspect of the architecture of the G.hn domain in accordance with the prior art.

FIG. 3A is a block diagram showing yet another aspect of the architecture of the G.hn domain in accordance with the prior art. As seen here in a standard configuration, each pair is connected to a single port of ports 12 in the twisted pair (TP) distribution point unit (DPU) 10 and through bundle 140 of twisted pairs to customer premise equipment (CPE) devices, 171-176 configured to twisted pairs.

When deployed over coax, a domain is defined between a single DM located at the multiplexing point (GAM) and multiple EPs. In general, crosstalk is avoided by utilizing a management channel between the DM and all EPs to allocate (dynamically) time slots for transmission between the DM and the EPs and vice versa. FEXT in the transmission from the DM to the EPs is avoided since the EP broadcasts information from the DM to all EPs (this information may be coded such that an EP can access only the information sent to him). Allocating different timeslots avoid FEXT in the transmission from the EPs to the DM for each EP transmission. The current version of G.hn over coax supports up to 16 EPs.

Figure 3B:
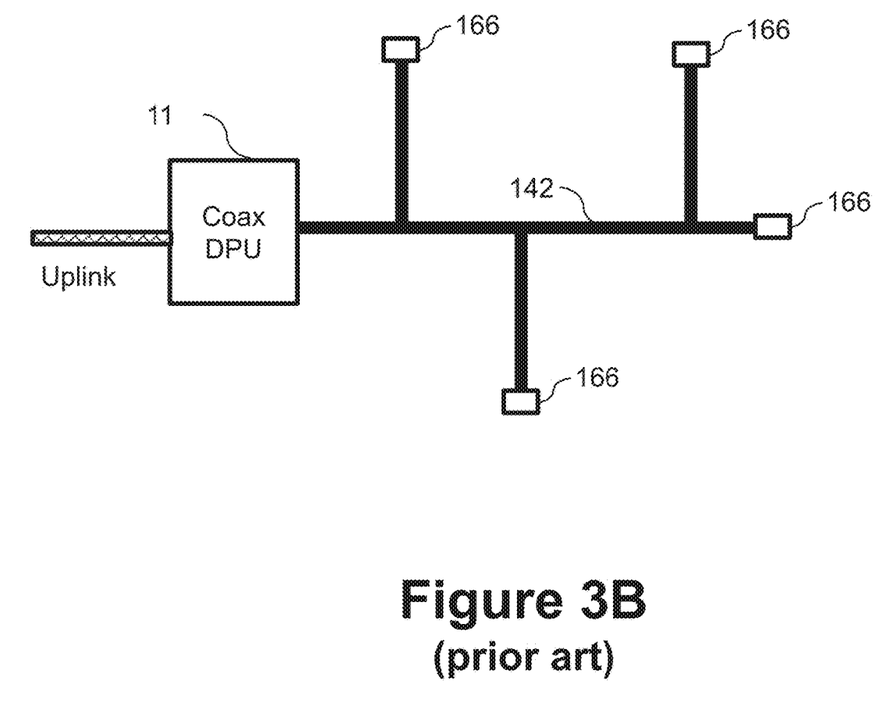
FIG. 3B is a block diagram showing yet another aspect of the architecture of the G.hn domain in accordance with the prior art.

FIG. 3B is a block diagram showing yet another aspect of the architecture of the G.hn domain in accordance with the prior art. As seen here, a coax DPU 11 is connected via a point-to-multipoint tree deployment of coaxial cable 142 with splitters (not shown), enabling to connect of each one of the CPE devices 161-166.

Using G.hn over coax has obvious advantages with respect to cost and power consumption (as only a single transceiver is used at the multiplexing point). Further, since crosstalk is entirely avoided by the transmission scheme, a fully dynamic BW allocation between transmission from DM to the EPs and vice versa can be applied. However, as mentioned above, twisted pairs are more widely available in MDUs.

SUMMARY OF THE INVENTION

In order to address the aforementioned challenges, it has been suggested by the inventors of the present invention to emulate a coaxial cabling environment for G.hn-compliant network devices while using legacy twisted pair cables. Thus, G.hn-compliant network devices configured for coax cables provide the befit of coax cables retrofitted into existing twisted pair cables infrastructure.

Some embodiments of the present invention provide a device for transmitting data, compliant with the G.hn standard for home networking, to a plurality of customer premise equipment (CPE) devices, over twisted pairs. The device may include: a G.hn access multiplexer (GAM) configured for transmitting data over coax cable and having a coax port; a single port to N-ports coax splitter, wherein the single port is connected to the coax port of the G.hn GAM, and wherein N is an integer; and N coax-to-twisted pair cable transformers, each connected to a respective port of the N-ports of the coax splitter. The cable transformer is an electrical device that allows balanced and unbalanced lines to be interfaced without disturbing the impedance arrangement of either line and is sometimes referred to as BALUN.

Some embodiments of the present invention provide another architecture for the device for transmitting data, compliant with the G.hn standard for home networking, to a plurality of customer premise equipment (CPE) devices, over twisted pairs. The device, according to the other architecture, may include: a G.hn access multiplexer (GAM) configured for transmitting data over coax cable and having a coax port; a coax to twisted pair cable transformer having a coax port connected to the coax port of said GAM, and a twisted pair port; and a single port to N-ports twisted pair splitter, wherein N is an integer.

Some embodiments of the present invention provide another architecture for the device for transmitting data, compliant with the G.hn standard for home networking, to a plurality of customer premise equipment (CPE) devices, over twisted pairs. The device, according to the other architecture, may include: a G.hn access multiplexer (GAM) configured for transmitting data over twisted pair with point-to-multipoint software; and a single port to N-ports twisted pair splitter, wherein N is an integer.

Some embodiments of the present invention provide systems implementing these devices in existing twisted pair cables infrastructure where CPE devices for coax are further configured to operate over twisted pair cables.

Some embodiments of the present invention provide methods of installing these devices in existing twisted pair cables infrastructure together with CPE devices for coax, which have been configured to operate over twisted pair cables.

Some embodiments of the present invention provide methods of installing these devices in existing twisted pair cables infrastructure together with CPE devices, which have been configured to operate over twisted pair cables in point-to-multipoint configuration.

Some embodiments of the present invention include a single device that can serve end customers on twisted pairs or coax.

Some embodiments of the present invention include adding an amplifier to overcome inherent power loss that occurs when using a single transceiver at the multiplexing point to communicate with multiple CPEs.

Some embodiments of the present invention include adding an amplifier to overcome the inherent power loss only in one direction of transmission (and thus transform a symmetric medium to an asymmetric one) to save cost, power consumption, and complexity.

Some embodiments of the present invention include adding phase shifters to overcome possible performance loss that may result from transmitting the same signal over multiple twisted pairs.

Some embodiments of the present invention include modifying the GAM or external coordination engine (such as VectorBoost) to coordinate between multiple point-to-multiple devices sharing the same copper bundle to minimize the impact of crosstalk between these devices.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

As mentioned above, G.hn has a mechanism that supports point-to-multi-point transmission. It is widely used when deployed over coax or powerlines. The main difference between this medium and twisted pairs medium is the crosstalk. Further, current implementations do not support point-to-multi-point when configured to operate over twisted pairs.

Figure 4A:
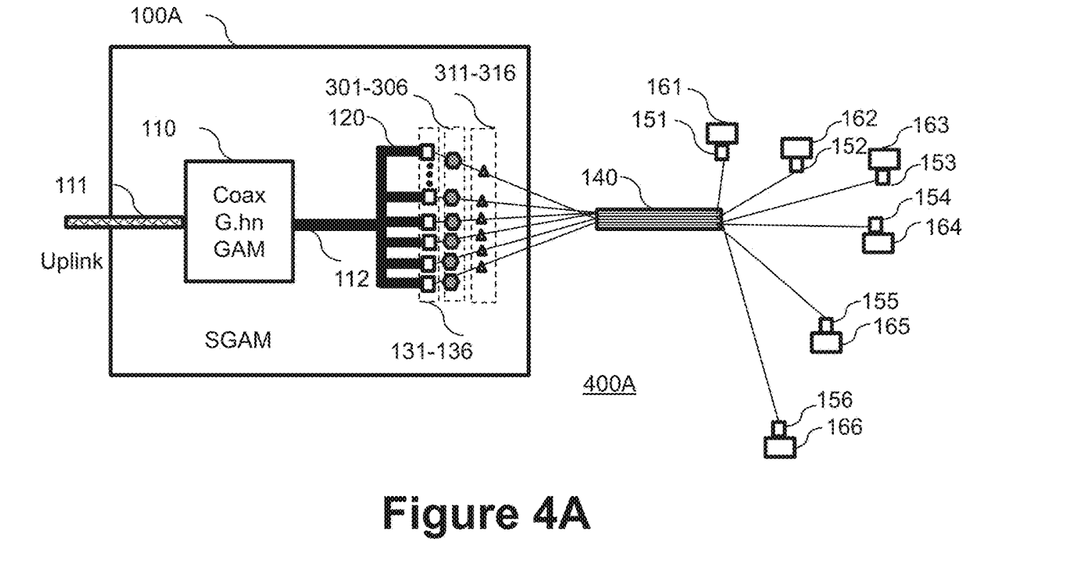
FIG. 4A is a high-level block diagram illustrating a system in accordance with embodiments of the present invention.

FIG. 4A is a block diagram illustrating a device 100A and a system 400A according to some embodiments of the present invention. Illustrated herein is device 100A for transmitting data, compliant with the G.hn standard for home networking, to a plurality of customer premise equipment (CPE) devices 161-166, over a bundle of twisted pairs cables 140. Device 100A may include a G.hn access multiplexer (GAM) 110 configured for transmitting data over a coax cable and having a coax port 112. Device 100A may include a single port to N-ports coax splitter 120, wherein a single port of the splitter is connected to the coax port 112 of G.hn GAM 110 and wherein N is an integer. Device 100A further contains N coax-to-twisted pair cable transformers 131-136, each connected to a respective port of the N-ports of the coax splitter 120.

According to some embodiments of the present invention, device 100A is configured to be retrofitted into the existing infrastructure of twisted pairs for transmitting data, compliant with the G.hn standard, to a plurality of customer premise equipment (CPE) devices, over twisted pairs cables. Device 100A includes a device for transmitting data compliant with G.hn, comprising a G.hn access multiplexer (GAM) configured for transmitting data over coax cable and having a coax port; a single port to N-ports coax splitter, wherein the single port is connected to the coax port of the G.hn GAM, and wherein N is an integer; and N coax to twisted pair cable transformers, each connected to a respective port of the N-ports of the coax splitter; N CPE devices configured to receive and transmit G.hn compliant data over coax cable, each one of the N CPE devices having a twisted pair cable to coax transformer; and a bundle at least N twisted pair cables connected on one end to the twisted pair ports of the N coax to twisted pair cable transformers, and on another end to the twisted pair cable to coax transformers of the N CPE devices.

Advantageously, the aforementioned architecture uses coax-designed GAM over twisted pair and converts the copper from multi-point-to-point architecture to point-to-multi-point. In this architecture, the far-end crosstalk (FEXT) is eliminated by connecting all the customers to the same twisted pair. Since GAM design is used to operate over coax, the GAM is defined as DM and each of the CPEs as EP per the G.hn standard. The data sent to a specific customer is received in all the CPEs, yet each transceiver knows what the time slot that is relevant to it is.

According to some embodiment, it is possible to provide phase adjustments per the number of connected pairs after installation of the system of the present invention. By adding an array of phase shifters 311-316, with an adjustable phase shifter per twisted pair, it will be possible for the person installing the GAM to ascertain that there is no case of mismatched phases between twisted pairs that may attenuate the signal to a minimum. Thus, post-installation phase shifting may be made possible.

Since G.hn modems are time division multiplexing (TDD) modems, filters may not be enough for the prevention of infinite amplification since transmission is performed over the entire allocated spectrum. Echo cancellation can be used, though its practical abilities impose a hard limit on the maximal level of amplification that can be used (and thus significantly reduce the potential of the device).

In any TDD system operating according to current standards, there is a "guard interval" or "silence period" between the end of the downstream transmission and the beginning of the upstream transmission and vice versa. During the guard interval, no data signals are transmitted.

Utilizing the fact that there is a guard interval between the end of transmission in the downstream direction and the beginning of transmission at the upstream (and vice versa), according to some embodiments of the invention, a system is proposed that may avoid the problem of instability. This may be achieved according to embodiments of the invention by enabling amplification only at the direction of transmission (and disabling amplifiers in the other direction). According to some embodiments of the invention, a detector is used to detect when transmission is stopped, or at least when transmission of data is stopped, or there is a silence period or interruption in transmission. In response to the detection of a silence period or interruption, amplification may be disabled in one direction and enabled in the opposite direction. For example, if transmission stops at the downstream direction, amplification in this direction may be disabled, and amplification in the upstream direction may be enabled and vice versa.

According to some embodiment, since transmitting the same signal over multiple copper pairs results in an inherent loss (due to splitting), controllable amplifier(s) can be added in various locations between the GAM 110 and twisted pairs bundle 140.

For example, as shown in FIG. 4A, amplifiers 301-306 may be an integral or additional part of each one of the plurality of cable transformers 131-136 at the end of the coax splitter or alternatively at the end of the twisted pair splitter 220 or between the splitter and the GAM.

According to some embodiments of the present invention, the level of amplification may be configured as a function of connected pairs such that spectral masks are not violated (either using a DIP switch or by adding a sensor to the splitting box, that indicates the number of connected pairs).

Figure 4B:
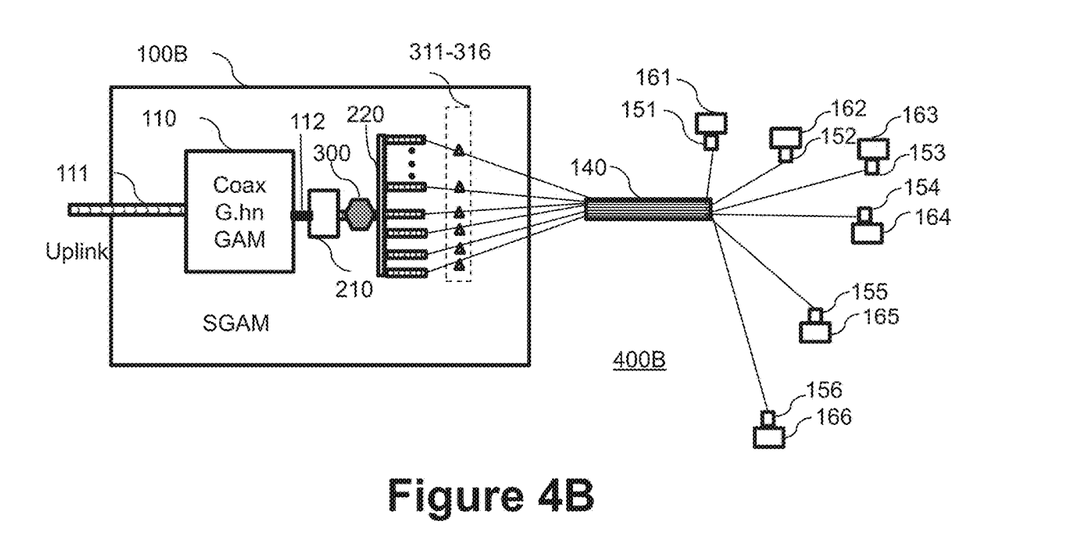
FIG. 4B is a high-level block diagram illustrating another system in accordance with embodiments of the present invention.

FIG. 4B is a block diagram illustrating a device 100B and a system 400B according to other embodiments of the present invention. Illustrated herein is device 100B for transmitting data, compliant with a standard for home networking G.hn, to a plurality of customer premise equipment (CPE) devices 161-166, over a bundle of twisted pairs cables 140. Device 100B may include a G.hn access multiplexer (GAM) 110 configured for transmitting data over a coax cable and having a coax port 112. Device 100B may include a coax to twisted pair cable transformer 210 having a coax port connected to the coax port 112 of GAM 110 and a twisted pair port. Device 100B may include a single port to N-ports twisted pair splitter 220, wherein the single port is connected to the twisted pair port of the coax to twisted pair cable transformer 210, wherein N is an integer.

According to some embodiments of the present invention, system 400B for transmitting data, compliant with a standard for home networking standard G.hn, to a plurality of customer premise equipment (CPE) devices, over twisted pairs cables, is further illustrated. System 400B includes a device 100B for transmitting data compliant with G.hn, including a G.hn access multiplexer (GAM) 110 configured for transmitting data over coax cable and having a coax port; a coax to twisted pair cable transformer having a coax port connected to the coax port of the GAM, and a twisted pair port; and a single port to N-ports twisted pair splitter, wherein the single port is connected to the twisted pair port of the coax to twisted pair cable transformer, wherein N is an integer; N CPE devices configured to receive and transmit G.hn compliant data over coax cable, each one of the N CPE devices having a twisted pair cable to coax transformer; and a bundle at least N twisted pair cables connected on one end to the N-ports of the twisted pair splitter, and on another end to the twisted pair cable to coax transformers of the N CPE devices.

Advantageously, the aforementioned architecture uses coax-designed GAM over twisted pair. In this architecture, all the pairs are concatenated at the GAM. While having FEXT (since the same signal is transmitted over a group of twisted pairs), since the same data is transmitted, each CPE views it as a modified channel.

According to some embodiment, it is possible to provide impedance matching-which should be done per the number of connected pairs. The impedance to match can be set using a dual in-line package (DIP) switch or by adding a sensor to the splitting box, which indicates the number of connected pairs.

According to some embodiment, it is possible to provide phase adjustments per the number of connected pairs after installation of the system of the present invention. By adding an array of phase shifters 311-316, with an adjustable phase shifter per twisted pair, it will be possible for the person installing the GAM to ascertain that there is no case of mismatched phases between twisted pairs that may attenuate the signal to a minimum. Thus, post-installation phase shifting may be made possible.

According to some embodiment, since transmitting the same signal over multiple copper pairs results in an inherent loss (due to splitting), a controllable amplifier can be added in various locations between the GAM 110 and twisted pairs bundle 140. For example, as shown in FIG. 4B, the amplifier can be coupled to cable transformer 210 connected to the GAM 110.

According to some embodiments of the present invention, the level of amplification may be configured as a function of connected pairs such that spectral masks are not violated (either using a DIP switch or by adding a sensor to the splitting box, that indicates the number of connected pairs).

According to some embodiments of the present invention, systems 400A and 400B may be required to handle a number of CPE beyond the crosstalk-free limit guaranteed for coax (usually 16 CPE devices). In order to achieve this end, in accordance with embodiments of the present invention, a GAM manager may be provided. The GAM manager (not shown here) may reside locally or remotely and is configured to schedule the operation of two or more GAMs.

Specifically, and similarly to the manager shown in FIG. 2, GAM manager, in accordance with some embodiments of the present invention, may be configured to synchronize upstream/downstream transmissions within the different domains by the alignment of the scheduling of each of the domains in the G.hn Network in order to eliminate near-end crosstalk (NEXT). Further, the GAM manager may control the PSDs used to better mitigate crosstalk between the GAMs.

Figure 4C:
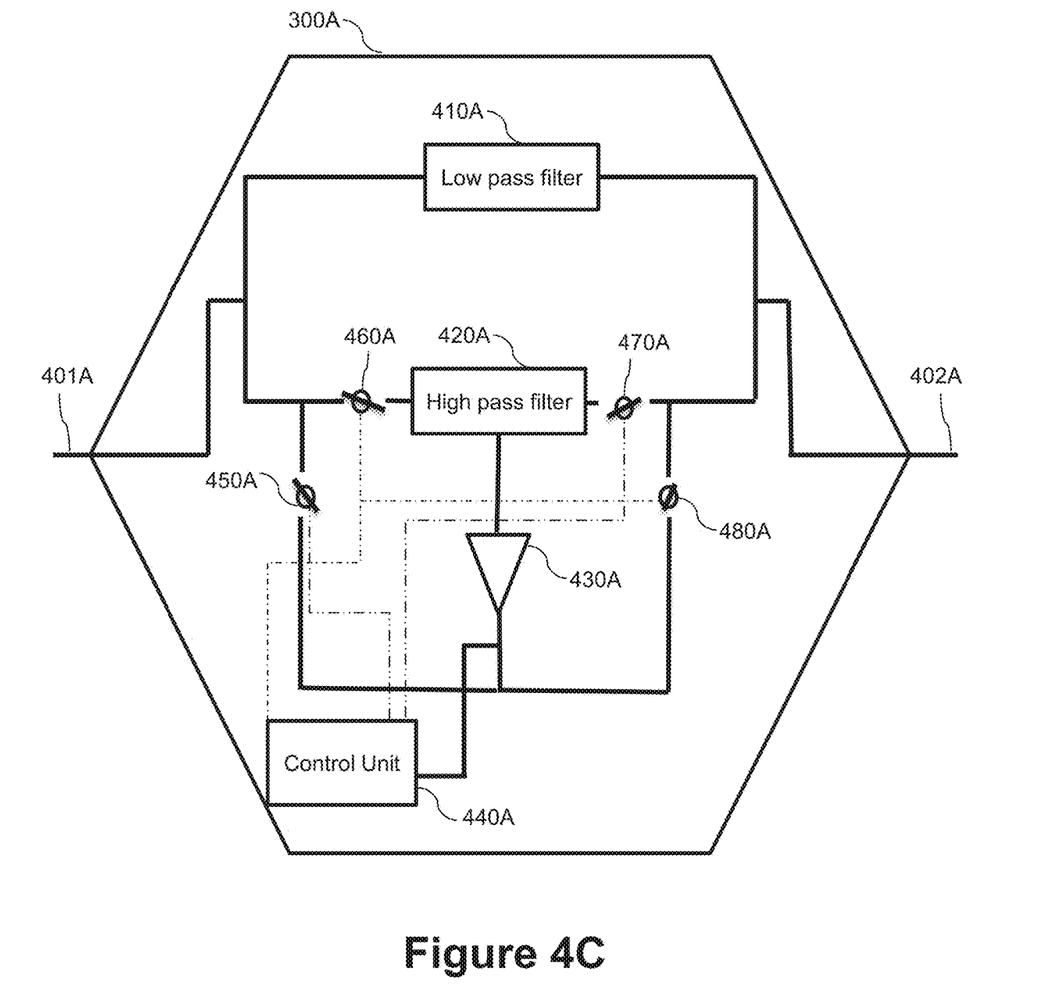
FIG. 4C is a high-level block diagram illustrating a controllable amplifier in accordance with some embodiments of the present invention.

FIG. 4C is a high-level block diagram illustrating a controllable amplifier 300A in accordance with the embodiments of the present invention. Controllable amplifier 300A may have a first terminal 401A and a second terminal 402A, the amplifier being located between the GAM and the bundle of twisted pairs, forming a signal path, and arranged to amplify using a bi-directional amplifier time division duplex (TDD) signals received at one of said first and second terminals for transmission from the other of said first and second terminals.

Controllable amplifier 300A being operable in a first configuration for amplifying TDD signals in one direction (from 401A to 402A) along the signal path and a second configuration for amplifying TDD signals in the opposite direction along the signal path (from 402A to 401A). A low pass filter 410A connected between first terminal 401A and second terminal 402A serves as a bypass for the low frequencies. A high pass filter 420A connected between the first and the second terminal in series to amplifier 430A; a control circuit 440A is arranged to detect a silent period in said signals and, in response to detecting a silent period, control said amplifier circuit to change configuration via controllable switches 450A 460A 470A 480A in a mutually exclusive manner.

In the first configuration, switches 450A and 470A are closed, and switches 460A and 480A are open, so amplifier 430A amplifies the signal coming upstream signals coming from 402A towards 401A.

In a second configuration, switches 460A and 480A are closed, and switches 450A and 470A are open, so amplifier 430A amplifies the signal coming in the downstream direction, i.e., signals coming from 401A towards 402A.

In this embodiment of the invention, the change in configuration is achieved through hardware using switches. Other possibilities for effecting the change illustrated in FIG. 4D include but are not limited to enabling or disabling one or more components in the respective amplifiers according to the desired direction of amplification. Thus, for example, the control circuit 440B may send enable/disable signals to amplifiers 434B and 432A, respectively. Controllable amplifier 300B includes first terminal 401B and second terminal 402B, low pass filter 410B serving as bypass for low frequencies, high pass filters 422B and 424B connected in series to amplifiers 434B and 432B respectively, and control unit 440B having enable signals connected to amplifiers 434B and 432B as explained above.

Figure 4D:
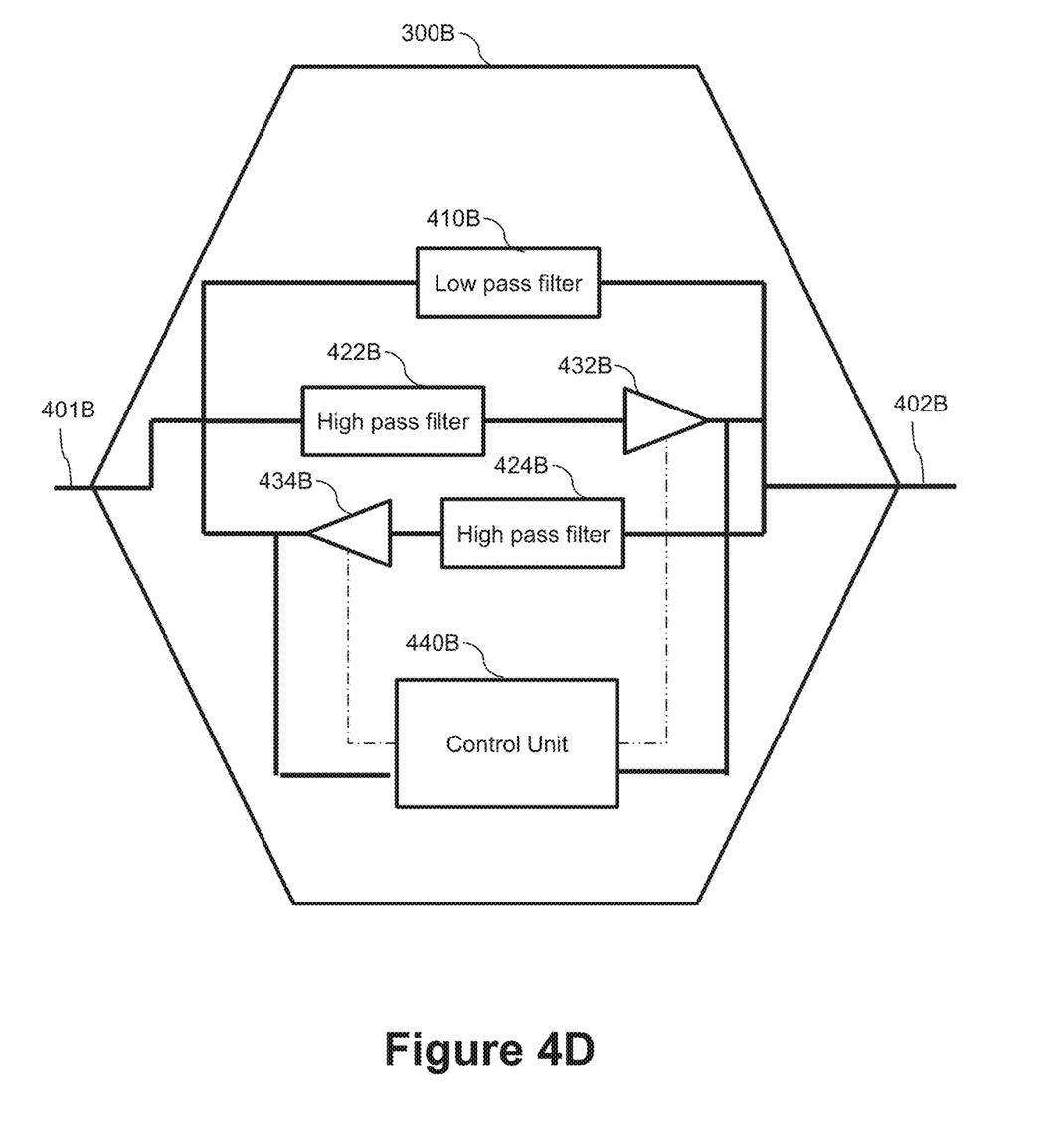
FIG. 4D is a high-level block diagram illustrating a controllable amplifier in accordance with other embodiments of the present invention.

For both controllable amplifiers 300A and 300B, It will be noted that the duration of the silence period is different depending on whether the signals are transitioning from upstream to downstream or vice versa. This difference may be detected and used by control circuits 440A or 440B to determine, for example, on initial start-up, which of the two possible circuit configurations should be implemented on detection of a signal interruption. Another alternative is to connect the control unit to the G.hn transceiver such that the g.hn transceiver will signal the controller the current direction of transmission. Other mechanisms will be familiar to those skilled in the art to determine the direction of change in the configuration of the amplifier circuit.

Figure 5A:
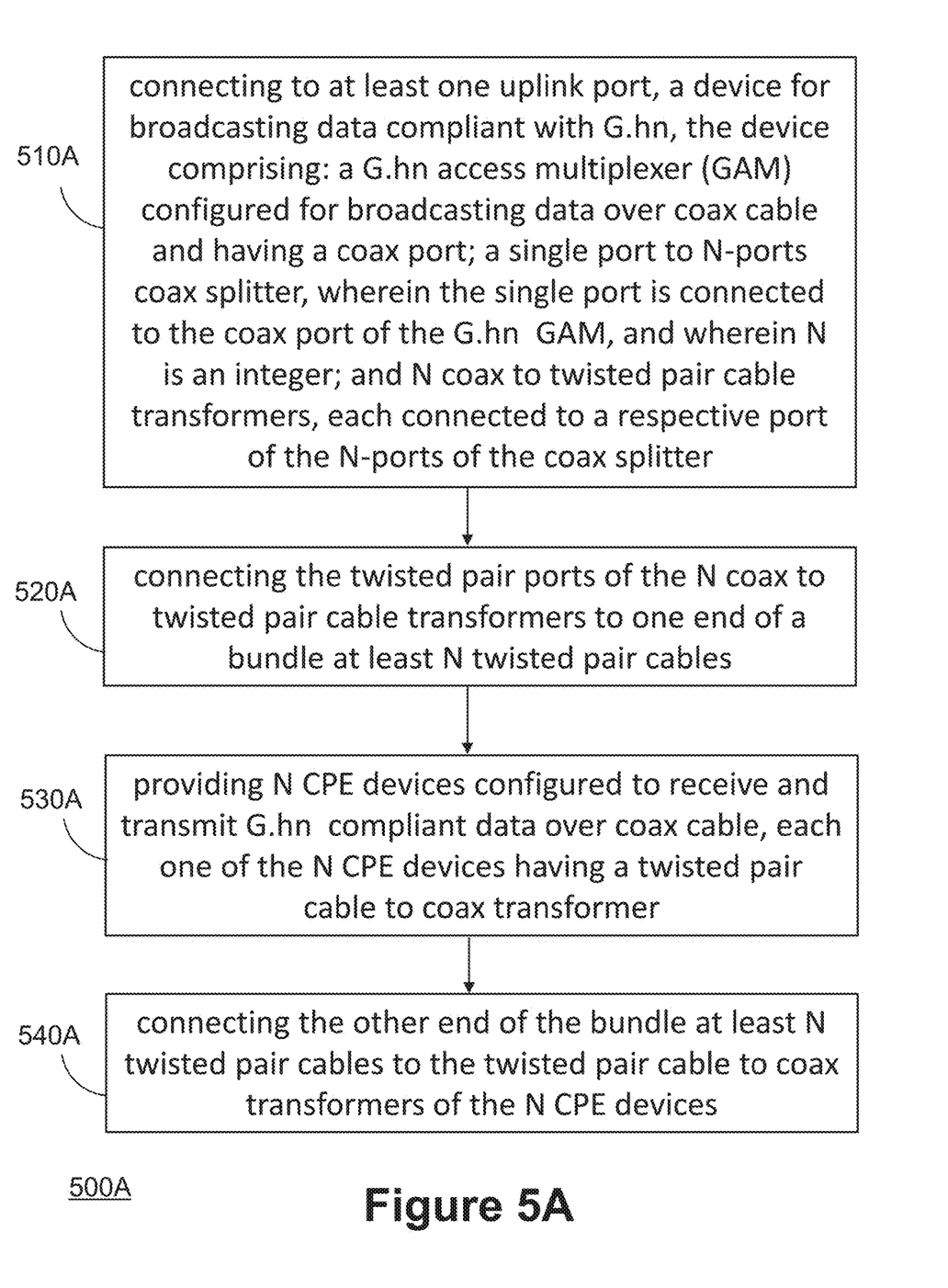
FIG. 5A is a high-level flowchart diagram illustrating a method in accordance with embodiments of the present invention.

FIG. 5A is a flowchart illustrating a method 500A of installing a system for transmitting data, compliant with the G.hn standard for home networking, to a plurality of customer premise equipment (CPE) devices, over an existing infrastructure of twisted pairs cables, the method including the following steps: connecting to at least one uplink port, a device for transmitting data compliant with G.hn, said device comprising: a G.hn access multiplexer (GAM) configured for transmitting data over coax cable and having a coax port; a single port to N-ports coax splitter, wherein the single port is connected to the coax port of the G.hn GAM, and wherein N is an integer; and N coax to twisted pair cable transformers, each connected to a respective port of the N-ports of the coax splitter 510A; connecting the twisted pair ports of the N coax to twisted pair cable transformers to one end of a bundle at least N twisted pair cables 520A; providing N CPE devices configured to receive and transmit G.hn compliant data over coax cable, each one of the N CPE devices having a twisted pair cable to coax transformer 530A; and connecting the other end of the bundle at least N twisted pair cables to the twisted pair cable to coax transformers of the N CPE devices 540A.

Figure 5B:
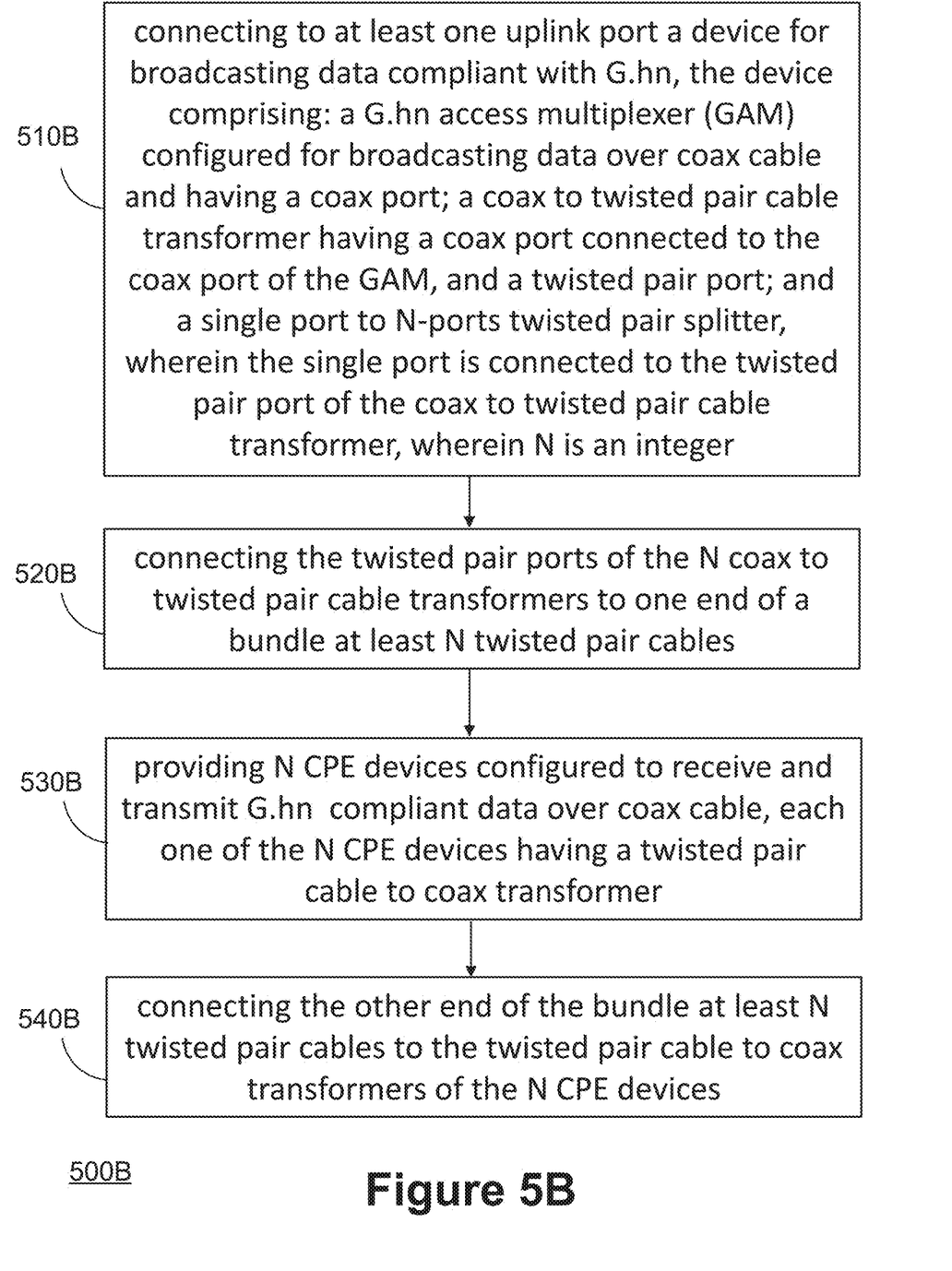
FIG. 5B is a high-level flowchart diagram illustrating a method in accordance with the embodiments of the present invention.

FIG. 5B is a flowchart illustrating a method 500B of installing a system for transmitting data, compliant with the G.hn standard, to a plurality of customer premise equipment (CPE) devices, over an existing infrastructure of twisted pairs cables, the method including the following steps: connecting to at least one uplink port a device for transmitting data compliant with G.hn, said device comprising: a G.hn access multiplexer (GAM) configured for transmitting data over coax cable and having a coax port; a coax to twisted pair cable transformer having a coax port connected to the coax port of said GAM, and a twisted pair port; and a single port to N-ports twisted pair splitter, wherein the single port is connected to the twisted pair port of the coax to twisted pair cable transformer, wherein N is an integer 510B; connecting the N-ports of the twisted pair splitter to one end of a bundle at least N twisted pair cables 520B; providing N CPE devices configured to receive and transmit G.hn compliant data over coax cable, each one of the N CPE devices having a twisted pair cable to coax transformer 530B; and connecting the other end of the bundle at least N twisted pair cables to the twisted pair cable to coax transformers of the N CPE devices 540B.

In the foregoing detailed description, numerous specific details are set forth in order to provide an understanding of the invention. However, it will be understood by those skilled in the art that the invention can be practiced without these specific details. In other instances, well-known methods, procedures, and components, modules, units, and/or circuits have not been described in detail so as not to obscure the invention. Some features or elements described with respect to one embodiment can be combined with features or elements described with respect to other embodiments.

The invention claimed is:

1. A device for transmitting data, compliant with G.hn standard to a plurality of customer premise equipment (CPE) devices, over twisted pairs cables, said device connectable to N CPE devices configured to receive and transmit G.hn compliant data over coax cable, each one of the N CPE devices having a twisted pair cable to coax transformer; and a bundle of at least N twisted pair cables connected on one end to the N-ports of the twisted pair splitter and on another end to the twisted pair cable to coax transformers of the N CPE devices, said device for transmitting data comprising:
a memory and a processor;
a G.hn access multiplexer (GAM) configured for transmitting data over coax cable and having a coax port;

a coax-to-twisted pair cable transformer having a coax port connected to the coax port of said GAM and a twisted pair port;

a single port to N-ports twisted pair splitter, wherein the single port is connected to the twisted pair port of the coax to twisted pair cable transformer, wherein N is an integer;

a controllable amplifier having a first and a second terminal, the amplifier is located between the GAM and a bundle of twisted pairs, forming a signal path, and arranged amplify time division duplex (TDD) signals received at one of said first and second terminals for transmission from another one of said first and second terminals, said controllable amplifier being operable in a first configuration for amplifying TDD signals in one direction along the signal path and a second configuration for amplifying TDD signals in an opposite direction along the signal path;

a control circuit arranged to detect a silent period in said signals and, in response to detecting a silent period, control said amplifier circuit to change the configuration; and an array of N adjustable phase shifters, each connected to one of the twisted pair cables, enabling an adjustment of the phase post installation.

2. The device, according to claim 1, further comprising an amplifier located between the GAM and the bundle of twisted pairs, wherein the level of amplification of the amplifier may be configurable.

3. The device, according to claim 1, wherein the GAM further comprises N ports of twisted pair cable.

4. A system for transmitting data, compliant with a G.hn standard for home networking to a plurality of customer premise equipment (CPE) devices, over twisted pairs cables, said system comprising:

a device for transmitting data compliant with G.hn, comprising:
a memory and a processor;
a G.hn access multiplexer (GAM) configured for broadcasting data over coax cable and having a coax port;
a coax to twisted pair cable transformer having a coax port connected to the coax port of said GAM and a twisted pair port;
a single port to N-ports twisted pair splitter, wherein the single port is connected to the twisted pair port of the coax to twisted pair cable transformer, wherein N is an integer;
N CPE devices configured to receive and transmit G.hn compliant data over coax cable, each one of the N CPE devices having a twisted pair cable to coax transformer,
a bundle of at least N twisted pair cables connected on one end to the N-ports of the twisted pair splitter and on another end to the twisted pair cable to coax transformers of the N CPE devices;
a controllable amplifier having a first and a second terminal, the amplifier is located between the GAM and the bundle of twisted pairs, forming a signal path, and arranged amplify time division duplex (TDD) signals received at one of said first and second terminals for transmission from the other of said first and second terminals, said controllable amplifier being operable in a first configuration for amplifying TDD signals in one direction along the signal path and a second configuration for amplifying TDD signals in an opposite direction along the signal path;

a control circuit arranged to detect a silent period in said signals and, in response to detecting a silent period, control said amplifier circuit to change the configuration; and an array of N adjustable phase shifters, each connected to one of the twisted pair cables, enabling an adjustment of the phase post installation.

5. The system, according to claim 4, further comprising a GAM manager, which is configured to manage two or more devices to reduce the impact of crosstalk between transmission over twisted pairs belonging to the same bundle.

6. The system, according to claim 4, further comprising an amplifier located between the GAM and the bundle of twisted pairs, wherein the level of amplification of the amplifier may be configurable.

7. A method of installing a system for transmitting data, compliant with a G.hn standard, to a plurality of customer premise equipment (CPE) devices, over an existing infrastructure of twisted pairs cables, said method comprising:

connecting to at least one uplink port a device for transmitting data compliant with G.hn, said device comprising: a G.hn access multiplexer (GAM) configured for transmitting data over coax cable and having a coax port; a coax to twisted pair cable transformer having a coax port connected to the coax port of said GAM, and a twisted pair port; and a single port to N-ports twisted pair splitter, wherein the single port is connected to the twisted pair port of the coax to twisted pair cable transformer, wherein N is an integer;

connecting the N-ports of the twisted pair splitter to one end of a bundle of at least N twisted pair cables;

providing N CPE devices configured to receive and transmit G.hn compliant data over coax cable, each one of the N CPE devices having a twisted pair cable to coax transformer;

connecting the other end of the bundle at least N twisted pair cables to the twisted pair cable to coax transformers of the N CPE devices;

providing a controllable amplifier having a first and a second terminal, the amplifier is located between the GAM and the bundle of twisted pairs, forming a signal path, and arranged amplify time division duplex (TDD) signals received at one of said first and second terminals for transmission from the other of said first and second terminals, said controllable amplifier being operable in a first configuration for amplifying TDD signals in one direction along the signal path and a second configuration for amplifying TDD signals in an opposite direction along the signal path;

providing a control circuit arranged to detect a silent period in said signals and, in response to detecting a silent period, control said amplifier circuit to change the configuration; and providing an array of N adjustable phase shifters, each connected to one of the twisted pair cables, enabling an adjustment of the phase post installation.

* * * * *